United States Patent [19]
Vegter et al.

[11] 3,920,573
[45] Nov. 18, 1975

[54] PREPARATION OF MIXTURES OF BISPHENOL A AND F

[75] Inventors: Geert C. Vegter; Johan van Gogh, both of Amsterdam, Netherlands

[73] Assignee: Shell Oil Company, Houston, Tex.

[22] Filed: Sept. 28, 1973

[21] Appl. No.: 401,909

[30] Foreign Application Priority Data
Apr. 26, 1973 United Kingdom............... 19909/73

[52] U.S. Cl.............................. 252/182; 260/619 A
[51] Int. Cl.²........................................ C07C 39/16
[58] Field of Search................. 252/182; 260/619 A

[56] References Cited
UNITED STATES PATENTS

| | | | |
|---|---|---|---|
| 2,792,429 | 5/1957 | Whelan............................ | 260/619 A |
| 3,075,015 | 1/1963 | Meyer et al..................... | 260/619 A |
| 3,418,378 | 12/1968 | MacNaughton et al......... | 260/619 A |
| 3,627,846 | 12/1971 | Meyer............................. | 260/619 A |
| 3,673,262 | 6/1972 | Prahl et al. .................... | 260/619 A |

FOREIGN PATENTS OR APPLICATIONS 914,926    1/1963    United Kingdom

*Primary Examiner*—Leland A. Sebastian
*Assistant Examiner*—Irwin Gluck

[57] ABSTRACT

Mixtures containing a major proportion of 2,2-bis(4-hydroxyphenyl)-propane and a minor proportion, e.g. 10–30 percent w, of the isomers of bis(hydroxyphenyl)methane are prepared by allowing a phenolic compound to react with mixtures of acetone and formaldehyde (preferably as trioxane). The recovered mixture of bisphenols serves as the starting material for the production of low viscosity epoxy resins.

6 Claims, No Drawings

PREPARATION OF MIXTURES OF BISPHENOL A AND F

BACKGROUND OF THE INVENTION

This invention relates to a process for the preparation of mixtures of bis(hydroxyphenyl)alkanes, particularly to the preparation of a mixture of bis(hydroxyphenyl)alkanes where one of the bis(hydroxyphenyl)alkanes is a bis(hydroxyphenyl)methane and more particularly where the mixture comprises 2,2-bis(4-hydroxyphenyl)propane and a minor proportion by weight of at least one isomer of bis(hydroxyphenyl)methane.

Said mixtures are known to be suitable starting materials for the preparation of low viscosity liquid epoxyalkyl ethers that can be stored for long periods without crystallization.

In the present specification the terms "diphenylolalkane", "diphenylolpropane" and "diphenylolmethane", are used to designate the respective gem-bis(-hydroxyphenyl)alkanes where one or both of the hydroxy groups is in either the 4 or 2 position relative to the alkane moiety. In a broader sense these terms also include the corresponding derivatives having 1 to 2 methyl substituents on one or both of the benzene nuclei, such as the corresponding hydroxytolyl or hydroxyxylyl derivatives.

The preparation of diphenylolalkanes by the reaction of phenolic compounds with either a ketone or an aldehyde using an acidic catalyst, preferably in the presense of a co-catalyst such as an organic compound containing a mercapto-group such as a thiol or a mercaptoalkanoic acid is well known. The method is of preeminent importance for the production of diphenylolpropane by the condensation of phenol and acetone. However, the method is less suited to the preparation of diphenylolmethane by condensation of formaldehyde and phenol, because under hitherto known conditions, substantial amounts of resinous by-products of the Novolac-type condensation are invariably formed in this reaction. See for example, J. E. Jansen, U.S. Pat. No. 2,468,982, issued May 3, 1949, example IX and X. See also W. H. Moss et al, U.K. 1,182,260, issued Feb. 25, 1970, where the same problem is noted even though the reaction is carried out without the co-catalyst. Special condensation conditions, depending on the ketone or aldehyde used, have been applied to maximize the yield of diphenylolalkane. Special purification methods have been needed in order to get satisfactory diphenylolalkanes (especially diphenylolmethane) for the conversions to the desired liquid epoxyalkyl ethers (see U.K. Pat. No. 1,182,260, published Feb. 25, 1970, and U.S. Pat. No. 3,073,868, issued Jan. 15, 1963).

It is also known in the art that certain mixtures of liquid epoxyalkyl ethers derived from two or more different diphenylolalkanes offer the commercially desirable properties of low viscosity and reduced tendency to crystallize. These epoxy mixtures have been prepared in the past by either mixing the separately prepared epoxy compounds (i.e., the 2,3-epoxypropoxy derivative of diphenylolpropane and diphenylolmethane) or by separately preparing and purifying the diphenylolpropane and diphenylolmethane — usually in different facilities — then mixing the purified bis-phenols and epoxidizing this mixture. See U.S. Pat. No. 3,051,681, issued Aug. 28, 1962 and U.K. Pat. No. 914,926, published Jan. 9, 1963.

It has been found that highly suitable mixtures of diphenylolpropane and diphenylolmethane can be prepared in a particularly efficient way by allowing phenol to react simultaneously with both acetone and formaldehyde. This method of diphenylolalkane production greatly reduces the amount of Novolac-type condensation products (by-product compounds with greater than 2 phenol groups in the molecule) normally associated with the condensation of phenol and formaldehyde and eliminates the purification and mixing steps normally associated with the productions of these mixed diphenylolalkanes. Despite the relatively high reactivity of formaldehyde as compared with acetone, only small-amounts of by products derived from formaldehyde were formed under conditions especially favorable for the production of diphenylolpropane. Consequently, in the known process of contacting diphenylolalkanes with epichlorohydrin to produce the epxoy compounds, one simply removes the excess phenol from the relatively pure mixture of diphenylolmethane and reacts with epichlorohydrin to produce the desired epoxy mixture, thereby avoiding both the conventional purification and mixing steps.

DESCRIPTION OF THE INVENTION

The present invention is directed toward a process for the production of a mixture of diphenylolalkanes, which process comprises contacting a phenolic compound with a mixture of acetone and formaldehyde in the presence of an acid catalyst with or without a sulphur containing co-catalyst to produce a mixture comprising diphenylolpropane and diphenylolmethane in which there is from about 1 percent w to about 50 percent w diphenylolmethane, preferably about 5 percent w to about 40 percent w diphenylolmethane and most preferably about 10 percent w to about 30 percent w diphenylolmethane and in which there is less than 10 percent w of molecules having more than two phenolic groups attached.

The reaction is preferably carried out by adding the acetone and formaldehyde as a mixture to the phenol under appropriate conditions, e.g. at elevated temperatures and in the presence of HCl and a suitable cocatalyst such as methanthiol. Alternatively, the acetone and formaldehyde may be added separately, either simultaneously or successively to the phenol. In the situation where they are added successively best results are obtained where the second carbonyl constituent is added before the first has completely reacted and it is preferred that the second carbonyl reactant be added before 10 or less percent of the first carbonyl reactant has been converted to diphenylolalkane. Acetone may be added first, then formaldehyde or a reverse sequence of addition can be used.

The formaldehyde can be used in any of its conventional forms, e.g, in the gaseous state, as an aqueous solution or in the form of a precursor such as the polyoxymethylene, paraformaldehyde or trioxane. The formaldehyde precursors have proven to be especially useful and the trioxane (cyclic trioxymethylene) is particularly preferred. The acetone may be added as a solution in an unreactive solvent but the preferred form is as the neat acetone or a solution of the acetone and the formaldehyde or formaldehyde precursor.

The proportion of acetone and formaldehyde used in the invention may vary from an acetone/formaldehyde molar ratio of about 20:1 to a molar ratio of about 0.5:1. Preferred acetone/formaldehyde molar ratios are from about 10:1 to 0.5:1 and especially preferred ratios are from 5:1 to 1:1.

The phenolic compounds used in the practice of the invention may be phenol itself and/or a methyl homologue thereof having at least one but preferably two or more unsubstituted positions ortho and/or para relative to the hydroxyl group. Examples of the phenolic compound are phenol, o-, m- and p-cresol and the xylenols (the 2,3-xylenol being preferred) and mixtures of these phenols. The preferred phenolic compound is phenol, $C_6H_5OH$.

In the reaction of a ketone or aldehyde with phenolic compounds to form the diphenylolalkane two moles of phenolic compound are required per mole of carbonyl compound used. However, an excess of the phenol or phenols is preferably employed. Suitable molar ratios of phenolic compound or compounds to the sum of acetone and formaldehyde range from about 10:1 to about 25:1, and preferred is the range from about 14:1 to about 16:1.

The invention is practiced using about 1 to about 5 mole percent based on phenol of a conventional acid catalyst such as hydrochloric acid or sulfuric acid and/or Lewis acids such as $BF_3$. Optionally, a co-catalyst can also be employed together with the acid catalyst at a mole percent based on phenol of about 0.05 to about 0.5. The co-catalysts are sulfur compounds known in the art such as mercaptoalkanoic acids like beta-mercaptopropionic acid or a thiol. Thiols have proved to be especially suitable and a preferred co-catalyst is methanethiol.

The reaction may be carried out in the presence of an inert solvent or diluent such as benzene, diethylether or isopropanol. It is preferred, however, that solvents or diluents are not present.

Suitable reaction temperatures are within the range from about 20°C to about 110°C. Particularly preferred reaction-temperature are from about 40°C to 70°C.

The reaction is preferably carried out at atmospheric pressure but if desired can be carried out at a pressure in the range of about 0.5 atmospheres to about 10 atmospheres.

The reaction may be carried out, for example, by introducing the acid catalyst into the molten phenol, say about 25 to about 35 milliequivalents (meq) acid per 100 g of phenolic compounds at the desired reaction temperature with subsequent addition of the acetone in which about 1 to 10 percent w of methanethiol has been dissolved, followed immediately afterwards by the addition of formaldehyde, preferably in the form of trioxane. The resulting mixture is then stirred at the desired temperature, for a period of time in the range of about 0.5 hr. to about 5 hrs., preferably between about 0.5 hrs. and 1 hr. After evaporation of the excess of the phenol and of the catalyst, the product is generally suitable for use, e.g., as a base material for the preparation of liquid epoxyalkyl ethers. A preceding purification step is not necessary.

Although excellent results are obtained in batchwise operations, the reaction may also successfully be carried out using a continuous process, e.g. by continuously introducing a mixture comprising the reactants, the acid and — optionally — the co-catalyst, into a reaction zone, for example, with residence times of from about 15 min. to about 5 hrs.

The reaction of phenol with acetone and trioxane, for example, may be carried out so as to form mixtures of diphenylolpropane and diphenylolmethane in virtually quantitative yields. These mixtures usually comprise a relatively high proportion of the respective bis(4-hydroxyphenyl)alkanes as compared with their corresponding isomers formed simultaneously, such as 2-(4-hydroxyphenyl)-2-(2-hydroxyphenyl)propane and bis(2-hydroxyphenyl)methane, respectively. Less than about 10 percent wt. and preferably less than about 8 percent wt. of the product is composed of molecules having greater than 2 phenolic groups and importantly this level of by-product is innocuous in the desired applications of the product. No material having a molecular weight about 500 was found to be present. No material having a molecular weight about 500 was found to be present.

The mixture of bis(hydroxyphenyl)alkanes obtained according to the process of the invention have a variety of applications, e.g., in the manufacture of plastics and resins. According to a particularly preferred aspect of the invention, these mixtures are subsequently converted into mixtures of epoxyalkyl ethers, especially those containing the respective bis(epoxyalkyl) ethers, by known methods (see, for example, U.K. Patent specification No. 914.926, published Jan. 9, 1963). Thus a preferred method is the reaction with epoxyhaloalkanes at about 50°C to about 150°C — usually in an alkaline medium — especially with epichlorohydrin, yielding compositions in which the epoxyalkyl groups are glycidyl groups. The epichlorohydrin is generally used in a large excess with respect to the mixture of diphenylolalkanes, e.g. about 5 to about 20 mol per mol, preferably about 10 to about 20 mol per mol.

It has proved particularly advantageous to start from a mixture of bis(hydroxyphenyl)alkanes comprising the respective propane and methane derivatives in molar ratios of from 10:1 to 0.5:1, preferably from 5:1 to 1:1.

The resulting epoxy compositions have low viscosities and can be stored for long periods at ordinary temperature or normal winter temperature without crystallization. This is of great advantage, for example, when they are used as a base for casting resins or for paints, lacquers, and varnishes. The usual additives such as a curing agent — e.g. an amine — polyhydric phenols, fillers, dyes and pigments can, of course, be incorporated into the compositions.

This invention is described by the following illustrative embodiments. These embodiments are intended for illustration and are not to be interpreted as limiting the scope of this invention.

ILLUSTRATIVE EMBODIMENTS I – III

Preparation of mixtures of diphenylolpropane and diphenylolmethane

In a 1-liter reaction vessel provided with a stirrer, gas inlet tube, thermowell and reflux condenser, 470 g (5.2 mol) of phenol was melted at 55°C, and 0.12–0.14 mol gaseous HCl were introduced into the melt with stirring. Subsequently, a solution of trioxane in acetone, also containing methanethiol (3 percent w on acetone) was added in one portion, whereupon the mixture was allowed to react for 45 min. at 55°C with continued stirring.

The excess of phenol and the catalysts were then removed by distillation by heating up to 180°C at 100 mm Hg (0.13 bar). The products were tacky but gradually crystallized to a hard mass on standing. The yields were between 96 and 100 percent w.

The reaction products were analyzed by gas-liquid chromatographic (GLC) analysis after silylation with bis(trimethyl)acetamide. The results are collected in table A below. They show that replacement of 10, 20 and 30 mole percent of the acetone by formaldehyde (as trioxane) afforded products containing 9.1, 21.6 and 28.7 percent w, respectively, of diphenylolmethane components. Only the respective bis(2-hydroxyphenyl)methane — together constituting the major part of the diphenylolmethane fraction — were identified by means of model compounds.

Table A

| Illustrative Embodiment | I | II | III |
|---|---|---|---|
| Reactor intake, g | 470 | 470 | 470 |
| phenol | | | |
| acetone | 17.3 | 15.5 | 13.5 |
| trioxane | 1.0 | 2.0 | 3.0 |
| Composition of reaction product, %w | | | |
| bis(2-hydroxyphenyl)methane | 2.6 | 7.1 | 9.0 |
| 2-(4-hydroxyphenyl-2-(2-hydroxyphenyl)propane | 4.1 | 4.4 | 3.2 |
| bis(4-hydroxyphenyl)methane | 4.5 | 9.4 | 12.3 |
| 2,2-bis(4-hydroxyphenyl)propane | 86.1 | 73.5 | 67.6 |
| 2,4-bis(p-hydroxy-alpha,alpha-dimethylbenzyl)phenol | 0.7 | 0.5 | 0.5 |
| unkown derivatives from formaldehyde | 2.0 | 5.1 | 7.4 |

ILLUSTRATIVE EMBODIMENT IV

Preparation of a diglycidyl ether

A mixture of 119 g of the product obtained in Embodiment III, and 550.5 g of epichlorohydrin was treated with 86.5 g of a 48.1 percent w aqueous NaOH solution as follows:

The mixture was heated to 70°C with stirring, whereupon 5–10 percent of the caustic solution was added within 15 minutes, while the temperature was raised from 70° to 100°C. Subsequently, the remainder of the caustic solution was added over a period of 1.75 hours, the temperature being maintained at 100°C, followed by continued stirring for another 5 minutes at 100°C. The epichlorohydrin was then removed by distillation at 25 mm Hg (0.033 bar), and the resulting resin obtained as the residue was heated for 0.5 hour at 160°C at the same pressure.

The resin was dissolved in 325 ml of methyl isobutyl ketone and washed by vigorous stirring with a 550 ml portion of water at 45°C during 15 minutes. This solution of the resin was then treated with 500 ml of a 5 percent w aqueous NaOH solution during 1.5 hours at 95°C, in order to convert any remaining chlorohydrin structures into epoxy groups by dehydrochlorination. The resin solution was finally washed with a 2 percent w aqueous solution of $NaH_2PO_4$ during 1 hour at 50°C, the methyl isobutyl ketone removed under reduced pressure, and the resin thus obtained was heated for 1 hour at 150°C at 15 mm Hg (0.02 bar). The resin was obtained in a yield of 174 g; it had an average molecular weight per epoxide of 181 and a viscosity of 84.9 poise at 25°C.

I claim as my invention:

1. The process for preparing a mixture of diphenylolalkanes consisting essentially of contacting a phenolic compound or compounds with a mixture of acetone and formaldehyde or a precursor of formaldehyde in the presence of an acid catalyst and optionally a beta-mercaptopropanoic or thiol co-catalyst, where;
   I. The molar ratio of acetone to formaldehyde is from about 20:1 to about 0.5:1,
   II. The molar ratio of phenolic compound or compounds to the sum of the acetone and formaldehyde is from about 10:1 to about 25:1,
   III. The reaction temperature is from about 20°C to about 110°C,
   IV. The reaction time is from about 0.25 hr. to about 5 hr., and recovering the resulting mixture of diphenylolpropane and diphenylolmethane having less than 10 percent by weight of by-products in which a molecule contains more than 2 phenolic groups.

2. The process of claim 1 in which the phenolic compound is phenol itself.

3. The process of claim 2 where the acetone to formaldehyde molar ratio is from about 5:1 to about 1:1.

4. The process of claim 3 where the phenol to acetone plus formaldehyde mole ratio is from about 14:1 to about 16:1.

5. The process of claim 4 where the reaction time is from 0.5 hr. to 1 hr.

6. The process of claim 5 where the formaldehyde is added as the formaldehyde precursor, trioxane.

* * * * *